United States Patent
Matsumoto et al.

(10) Patent No.: US 11,787,437 B2
(45) Date of Patent: Oct. 17, 2023

(54) DRIVING DOMAIN MANAGEMENT UNIT, DRIVING DOMAIN MANAGEMENT SYSTEM, AND DRIVING DOMAIN MANAGEMENT METHOD

(71) Applicant: Hitachi, Ltd., Tokyo (JP)

(72) Inventors: Takashi Matsumoto, Tokyo (JP); Akihiro Kondo, Tokyo (JP)

(73) Assignee: Hitachi, Ltd., Tokyo (JP)

(*) Notice: Subject to any disclaimer, the term of this patent is extended or adjusted under 35 U.S.C. 154(b) by 36 days.

(21) Appl. No.: 17/516,012

(22) Filed: Nov. 1, 2021

(65) Prior Publication Data

US 2022/0135069 A1    May 5, 2022

(30) Foreign Application Priority Data

Nov. 5, 2020  (JP) ................... 2020-185310

(51) Int. Cl.
*B60W 60/00* (2020.01)
*G05D 1/02* (2020.01)

(52) U.S. Cl.
CPC ......... *B60W 60/001* (2020.02); *G05D 1/0274* (2013.01); *B60W 2555/20* (2020.02); *B60W 2556/10* (2020.02); *B60W 2556/45* (2020.02)

(58) Field of Classification Search
CPC .......... B60W 60/001; B60W 2555/20; B60W 2556/10; B60W 2556/45; G05D 1/0274; G08G 1/0116; G08G 1/0129; G08G 1/0133; G08G 1/0141; G08G 1/096725; G08G 1/096741; G08G 1/096775;

(Continued)

(56) References Cited

U.S. PATENT DOCUMENTS 9,816,827 B1    11/2017 Slusar
2016/0356623 A1    12/2016 Matsumoto
(Continued)

FOREIGN PATENT DOCUMENTS

JP    2017-003310 A    1/2017

OTHER PUBLICATIONS

EESR directed to the EP counterpart application No. 21204959.7 dated Mar. 29, 2022.
(Continued)

*Primary Examiner* — Rodney A Butler
(74) *Attorney, Agent, or Firm* — BAKER BOTTS L.L.P.

(57) ABSTRACT

A driving domain management unit which includes a change pattern setting portion that selects one of multiple typical patterns previously patterning drivable domains based on input information changing in time series; a driving condition monitor portion that determines an event based on collected event related information from the outside; an exclusion domain management portion that determines an exclusion domain prohibiting driving of the vehicles in preference to the driving permission domain based on position information about the event, the position information being contained in the event related information used for the determination of the event; a distribution portion that distributes, to the vehicles, the selected typical pattern and the information about the determined exclusion domain or the information based on these pieces of information; and a data storage portion that stores the multiple typical patterns and the exclusion domain information.

15 Claims, 7 Drawing Sheets

(58) Field of Classification Search
CPC ....... G08G 1/096816; G08G 1/096844; G08G 1/0112; G08G 1/16; G08G 1/0108; G08G 1/0125; G08G 1/048; H04W 4/022; H04W 4/029
See application file for complete search history.

(56) References Cited

U.S. PATENT DOCUMENTS

2020/0264627 A1    8/2020  Panzica et al.
2020/0286370 A1*  9/2020  Wickramarathne ........................ G08G 1/0112

OTHER PUBLICATIONS

Communication pursuant to Article 94(3) EPC dated Jun. 21, 2023 for European Application No. 21204959.7.

* cited by examiner

BEFORE EVENT OCCURRENCE : POINT A→4→3→2→POINT B
DURING EVENT OCCURRENCE : POINT A →4→5→8→7→1→POINT B

DRIVING DOMAIN MANAGEMENT UNIT, DRIVING DOMAIN MANAGEMENT SYSTEM, AND DRIVING DOMAIN MANAGEMENT METHOD

BACKGROUND

The present invention relates to a driving domain management unit, a driving domain management system, and a driving domain management method. The present invention is preferably applicable to the driving domain management unit, driving domain management system, and driving domain management method to determine and manage a driving domain of an autonomous vehicle.

Recently, autonomous vehicles capable of being autonomously driven (autonomous driving) are developing. When driving of an autonomous vehicle is controlled, the definition of an operation design domain (ODD: Operational Design Domain) is needed. The ODD is determined from multiple conditions such as a road condition, geography condition, and environment condition.

However, for example, as roads deteriorate, the state of a condition forming the ODD may change from the state at the design time. On the domain (road section) outside the ODD, vehicles need to be prevented from being automatically driven.

As a technology useful for the above action, for example, Japanese unexamined patent application publication No. 2017-003310 discloses an autonomous driving control unit. The autonomous driving control unit determines road deterioration based on deterioration of positioning accuracy by an in-vehicle sensor. The deteriorated road is excluded when a route is generated to generate a driving route suitable for autonomous driving.

SUMMARY however, the autonomous driving control unit disclosed in Japanese unexamined patent application publication No. 2017-003310 determines the deterioration of positioning accuracy when position information is undetectable or a white line is undetectable. This is considered to be a technology dedicated for determining deterioration of a road surface. For example, Japanese unexamined patent application publication No. 2017-003310 describes that "the information relating to driving environment such as weather, air temperature, and an event date is usable as additional information" to determine accuracy deterioration. Specific usage of the additional information is not indicated at all.

In contrast, as above, the ODD of an autonomous vehicle is determined based on multiple conditions such as a road condition, geography condition, environmental condition, etc. In Japanese unexamined patent application publication No. 2017-003310 using only deterioration of road surfaces as criteria for the determination, it is difficult to flexibly treat various events that may obstruct driving. A problem thus arises in managing safety driving domains for vehicles.

The present invention is made in consideration of the above point. To treat various events that may obstruct traveling, a driving domain management unit and a driving domain management method are proposed to manage domains where vehicles can be safely driven.

To solve the problem, the present invention provides a driving domain management unit that manages driving domains for autonomous vehicles. The driving domain management unit includes: a change pattern setting portion that selects one of multiple typical patterns previously patterning drivable domains to determine a driving permission domain permitting driving of the vehicles based on input information changing in time series; a driving condition monitor portion that collects event related information about an event causing deterioration of a road condition from the outside to determine the event based on the collected event related information; an exclusion domain management portion that determines an exclusion domain prohibiting driving of the vehicles based on the determination result by the driving condition monitor portion and the position information about the above event contained in the event related information used for the determination in preference to the driving permission domain indicated in the typical pattern; a distribution portion that distributes, to the vehicles, the typical pattern selected by the change pattern setting portion and the information about the exclusion domain determined by the above exclusion domain management portion or the typical pattern and the information based on the exclusion domain; and a data storage portion that stores the multiple typical patterns and the information about the exclusion domain.

To solve the problem, the present invention includes one or more autonomous vehicles and a driving domain management unit communicatively connected to the vehicles to manage the driving domains for the vehicles. The driving domain management unit includes: a change pattern setting portion that determines a driving permission domain permitting driving of the vehicles by selecting one of typical patterns previously patterning drivable domains based on input information changing in time series; a driving condition monitor portion that collects event related information about an event causing deterioration of a road condition from the vehicles to determine the event based on the collected event related information; an exclusion domain management portion that determines an exclusion domain prohibiting driving of the vehicles in preference to the driving permission domain indicated in the typical pattern based on a result of the determination by the driving condition monitor portion and the position information about the event contained in the event related information used in the determination; a distribution portion that distributes, to the vehicles, the typical pattern selected by the change pattern setting portion and the information about the exclusion domain determined by the exclusion domain management portion or the typical pattern and the information based on the exclusion domain; and a data storage portion that stores the multiple typical patterns and the information about the exclusion domain. A driving domain management system is provided in which autonomous driving of the vehicles is permitted in the driving domain by using the information distributed from the distribution portion and performed.

To solve this problem, the present invention provides a driving domain management method using the driving domain management unit that manages driving domains for autonomous vehicles. The method includes: a typical pattern selecting step of determining a driving permission domain permitting driving of the vehicles by selecting one of multiple typical patterns previously patterning drivable domains based on the input information changing in time series; an event determination step of determining the event based on the collected event related information by collecting the event related information about the event causing deterioration of a road condition from the outside; an exclusion domain determination step of determining an exclusion domain permitting driving of the vehicles in preference to the driving permission domain indicated in the typical pattern based on the result of the determination at the event determination step and the position information about the event contained in the event related information used for the determination; and a distribution step of distributing, to the vehicles, the typical pattern selected at the typical pattern selection step and the information about the exclusion domain determined at the exclusion domain determination step or the typical pattern and the information based on the exclusion domain.

According to the present invention, domains where vehicles are safely drivable are manageable in response to various events that may obstruct driving.

DETAILED DESCRIPTION

Embodiments of the present invention are explained below in detail with reference to the drawings.

(1) First Embodiment (1-1) Configuration

Figure 1:
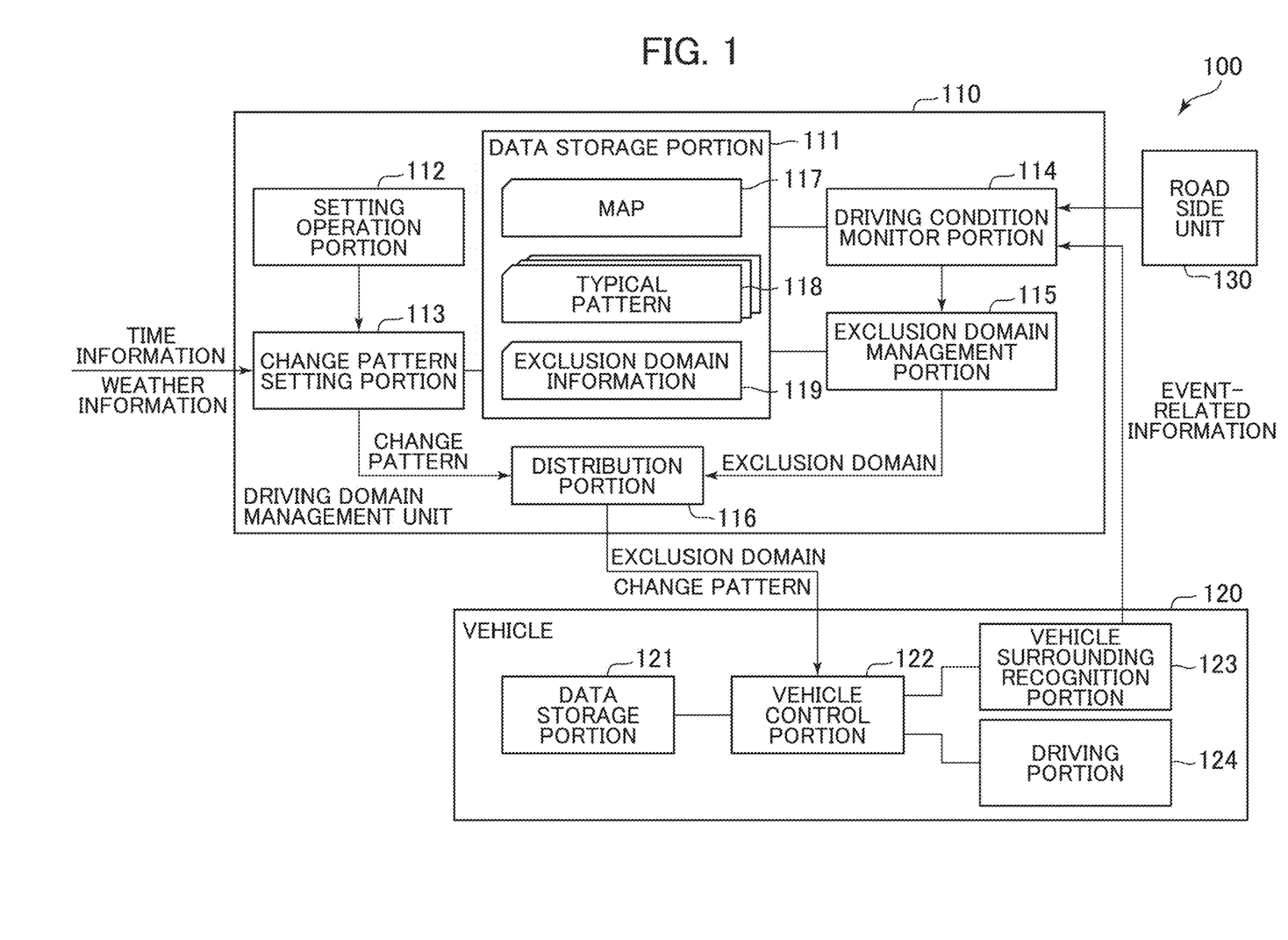
FIG. 1 is a block diagram illustrating an example of a configuration of a driving domain management system 100 of the first embodiment of the present invention.

FIG. 1 is a block diagram illustrating an example of a configuration of a driving domain management system 100 of the first embodiment of the present invention. As in FIG. 1, the driving domain management system 100 includes a driving domain management unit 110, a vehicle 120, and a road side unit 130.

The driving domain management unit 110 manages domains (driving permission domains) permitting driving of the vehicle 120 to wirelessly communicate with the vehicle 120 and the road side unit 130. The vehicle 120 is capable of being autonomously driven (autonomous driving) corresponding to multiple vehicles autonomously driven within ranges of the driving permission domains managed by the driving domain management unit 110. The vehicle 120 wirelessly transmits, to the driving domain management unit 110, predetermined information (event related information mentioned later) collected by a vehicle surrounding recognition portion 123. The multiple road side units 130 are installed, e.g., near roads to collect predetermined information (event related information) about roads or conditions around roads. For example, the units 130 corresponds to a monitor camera, a sensor, etc. The information collected by the road side units 130 is wirelessly transmitted to the driving domain management unit 110. Internal configurations of the driving domain management unit 110 and vehicle 120 are explained below.

First, the internal configuration of the driving domain management unit 110 is explained. As in FIG. 1, the driving domain management unit 110 includes a data storage portion 111, a setting operation portion 112, a change pattern setting portion 113, a driving condition monitor portion 114, an exclusion domain management portion 115, and a distribution portion 116.

The driving domain management unit 110 is, for example, a calculator having a wireless communication function. For example, in the driving domain management unit 110, the data storage portion 111 is a storage inside or outside the calculator, the setting operation portion 112 is an I/O device such as a display, a keyboard, or a mouse, and the distribution portion 116 is a wireless communication interface provided to the calculator. The change pattern setting portion 113, the driving condition monitor portion 114, and the exclusion domain management portion 115 are achieved when a processor such as a CPU (Central Processing Unit) executes predetermined programs.

The data storage portion 111 has a function to store data used in the driving domain management unit 110. Specifically, the data storage portion 111 stores a map 117, typical patterns 118, and exclusion domain information 119.

The map 117 is detailed map information about roads. For example, the map 117 is able to use road data including road link information commonly used in navigation systems. The map 117 may also include, for example, detailed information such as the number of lanes in each direction in each section of each road. When a range (autonomous driving domain) permitting autonomous driving of the vehicles 120 is determined, the information indicating the range of the autonomous driving domain is registered to the map 117.

The typical patterns 118 are information indicating a domain (driving permission domain) permitting driving of the vehicles 120. Various driving permission domains (or combinations of the domains) are previously standardized to multiple patterns and stored. In the definition of the operation design domain (ODD) for autonomous vehicles, it is common that a driving permission domain changes with a time condition (date, day of the week, time zone, etc.) and a weather condition (air temperature, weather, precipitation, etc.). Then, in the driving domain management unit 110, in a mode corresponding to the definition of the ODD about the vehicle 120, the multiple typical patterns 118 are prepared for multiple types of driving permission domains and stored to the data storage portion 111. To efficiently process information, each typical pattern 118 is provided with a pattern number as an identifier (in this example, typical pattern 1, typical pattern 2, or so on).

Figure 2:
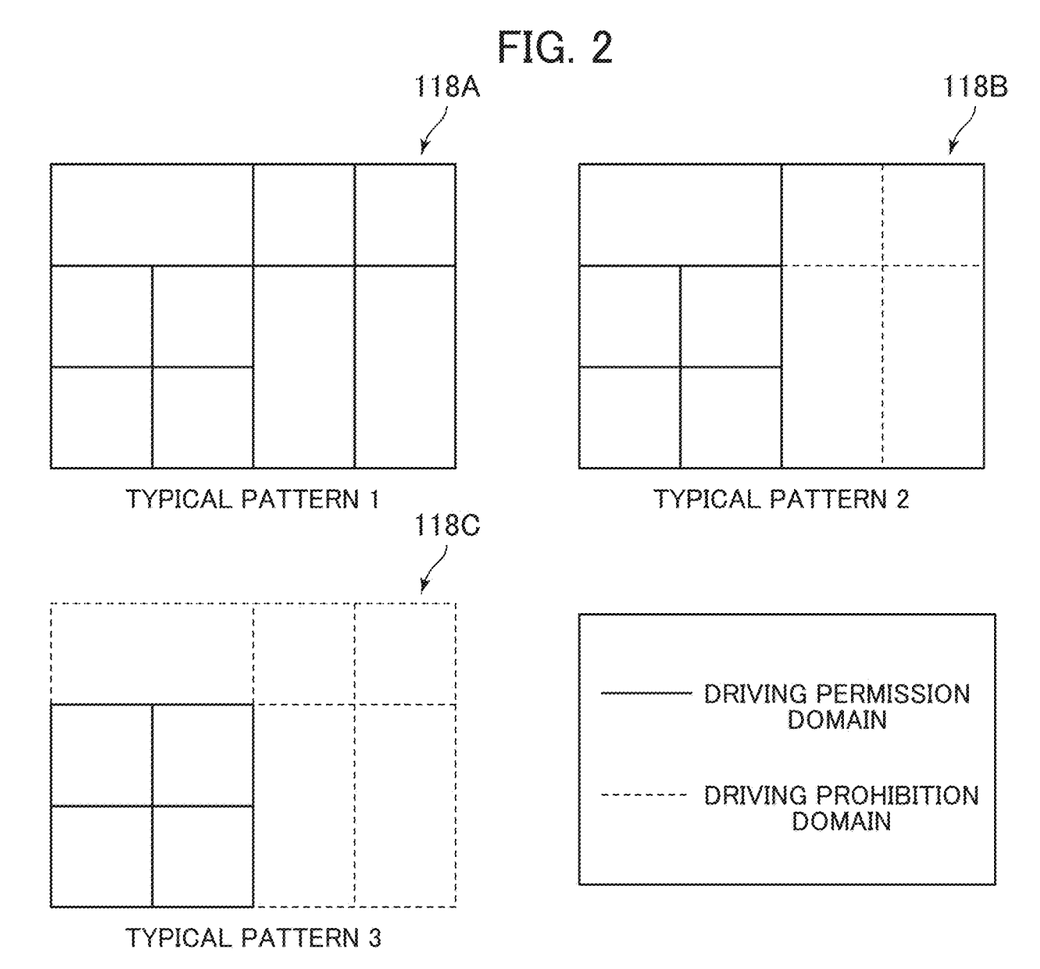
FIG. 2 explains images of typical patterns 118.

FIG. 2 explains images of the typical patterns 118. The typical patterns 118A to 118C illustrated in FIG. 2 are examples of the typical patterns 118 that are set to have different driving permission domains for the same area. The pattern number of the typical pattern 118A is provided with the "typical pattern 1." The pattern number of the typical pattern 118B is provided with the "typical pattern 2." The pattern number of the typical pattern 118C is provided with the "typical pattern 3."

When a specific driving permission domain is confirmed in FIG. 2, all the roads (road links) in the target area are set as driving permission domains in the typical pattern 1 (typical pattern 118A). In contrast, in the typical pattern 2 (typical pattern 118B), some roads (road links) in the right half in the target area are set as driving prohibition domains prohibiting driving. In the typical pattern 3 (typical pattern 118C), half or more of roads (road links) are set as driving prohibition domains. The driving permission domains are limited to the lower left portion of the target area.

In the present embodiment, as in the typical patterns 118A to 118C illustrated in FIG. 2, the "typical" patterns are prepared for driving permission domains. Thus, even when the driving permission domain is needed to be changed due to a schedule or occurrence/release of an event mentioned later, action is easily possible by changing the selected pattern (pattern number). This is expectable, e.g., to reduce the processing load and improve the processing speed.

The exclusion domain information 119 indicates "exclusion domains" that do not permit driving of the vehicles 120 irrespective of setting of the driving permission domains by the typical patterns 118 (that is, in preference to the setting of the driving permission domains by the typical patterns 118). The exclusion domain information 119 is determined by the exclusion domain management portion 115 and held in the data storage portion 111.

Figure 5:
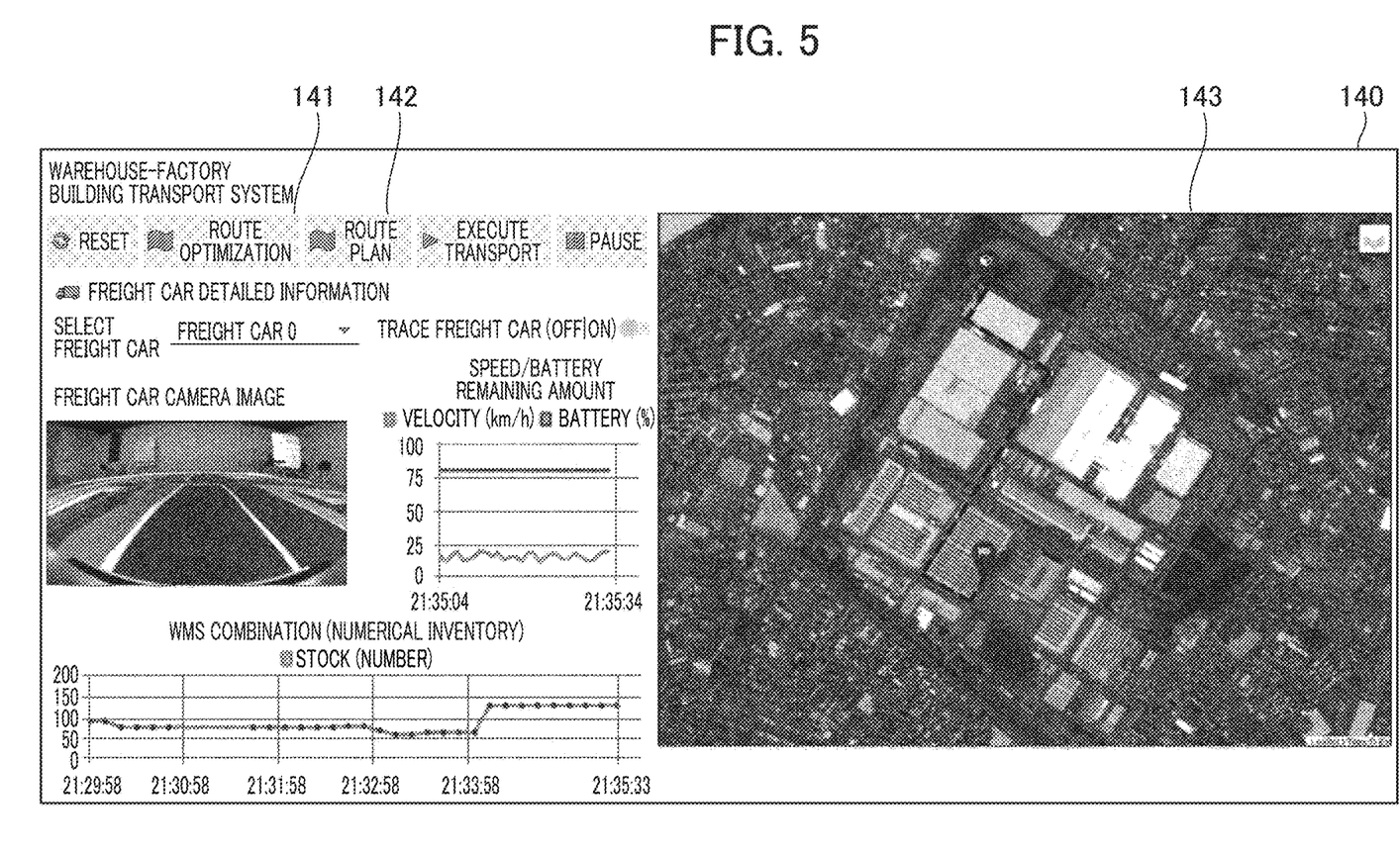
FIG. 5 illustrates an example of a dispatcher setting screen.

The setting operation portion 112 has a function to change setting of driving management for the vehicles 120 in response to manual operations of the user (dispatcher) to a dispatcher setting screen. Specifically, for example, the setting and selection of the driving permission domains (typical patterns 118) and the exclusion domains (exclusion domain information 119) are changeable. The setting operation portion 112 and the dispatcher setting screen are explained in detail in the modification 2 of the present embodiment mentioned later. FIG. 5 illustrates a specific example of the dispatcher setting screen.

The change pattern setting portion 113 selects the typical pattern 118 from multiple types of the typical patterns 118 prepared in the data storage portion 111 based on the information changing in time series (time information, weather information, etc.) to determine a domain (driving permission domain) permitting driving of the vehicles 120. Specifically, for example, the change pattern setting portion 113 can select the driving permission domain (typical pattern 118) based on time information according to a schedule of a predetermined time condition. Moreover, for example, the change pattern setting portion 113 can select the driving permission domain (typical pattern 118) based on weather information according to a predetermined plan of a weather condition. The selection result of the typical pattern 118 by the change pattern setting portion 113 is then transmitted to the distribution portion 116, for example, by the pattern number.

When there is a request about selection of the driving permission domain from the setting operation portion 112 in association with a manual operation by the dispatcher, the change pattern setting portion 113 selects the typical pattern 118 in response to the request.

FIG. 1 illustrates that the change pattern setting portion 113 acquires time information and weather information from outside the driving domain management unit 110. The driving domain management system 100 of the present embodiment is not limited to such a configuration. That is, time information and weather information is not limited to external inputs and may acquire target information in the driving domain management unit 110. For example, time information is acquired from a clock provided to the driving domain management unit 110. The above time information and weather information are not limited to detailed information types. As one example, it is preferable that the above time information and weather information correspond to time conditions (the date, a day of the week, a time zone, etc.) and weather conditions (air temperature, weather, precipitation, etc.) that are needed for the definition of the operation design domain (ODD) of the autonomous vehicles.

The driving domain management unit 110 receives predetermined information (also called event related information) about "events" that may influence driving permission or prohibition for the vehicles 120 from the outside (the vehicles 120 and the road side units 130), and determines (detects) occurrence/release of the event based on the received information. The "event" mainly occurs suddenly to cause deterioration of a road condition, and specifically corresponds to traffic congestion, accidents, rockfalls, flooding, poor visibility, etc. The event related information received by the driving condition monitor portion 114 can be directed to various types of information relating to the above events. Specifically, for example, in addition to information about stay of vehicles such as traffic congestion and accidents, information about defects of roads such as obstacles, flooding, icing, and deterioration and information about poor visibility such as fog, dust, and rainfall can be directed by the event related information. Any criterion of determination of occurrence/release of an event may be set using event related information.

The driving condition monitor portion 114 notifies the exclusion domain management portion 115 of "position information" indicating the determination result of occurrence/release of an event, the occurrence place of the event, etc.

Here, the "position information" about an event is explained in detail.

In the present embodiment, the position information about an event is included in the event related information collected from the outside (the vehicles 120 and the road side units 130), and enables identification of the occurrence place of the event. For example, when an event in which a specific road is blocked due to a certain obstacle is assumed, it becomes important to identify the position and influence range (size) of the obstacle as the occurrence place of the event. Specifically, for example, to identify the position of the obstacle, latitude-longitude information or link ID information may be used. Specifically, for example, to identify the influence range of the obstacle, size information, type information, etc. about the obstacle may be used in addition to the link ID information.

Among the information, the latitude-longitude information indicates a center position of an obstacle or any endpoint of an obstacle by a latitude and longitude. When the latitude-longitude information is included in position information about an event, the exclusion domain management portion 115 takes into account the size of an obstacle in addition to the latitude and longitude. The occurrence location of the event can be thus identified to calculate an exclusion domain (exclusion range) where a road is closed due to the event. When the obstacle size in the event is not acquired individually, the exclusion domain may be calculated using a prepared fixed size (for example, 5 m in width×10 m in length).

The link ID information indicates an occurrence place of an event by using a link ID that is an identifier previously applied to each "road link" indicated by linking nodes indicating feature points (an intersection, road turn, dead end road, etc.). The road link available in the present embodiment is not limited to one assigned a road in a predetermined section as one unit. The road link may be assigned a more specific road section such as a road lane (driving lane) as one unit. When a road link is assigned a more specific road section, the accuracy of position information about an event is improved to enable setting of an accurate exclusion domain.

Figure 3:
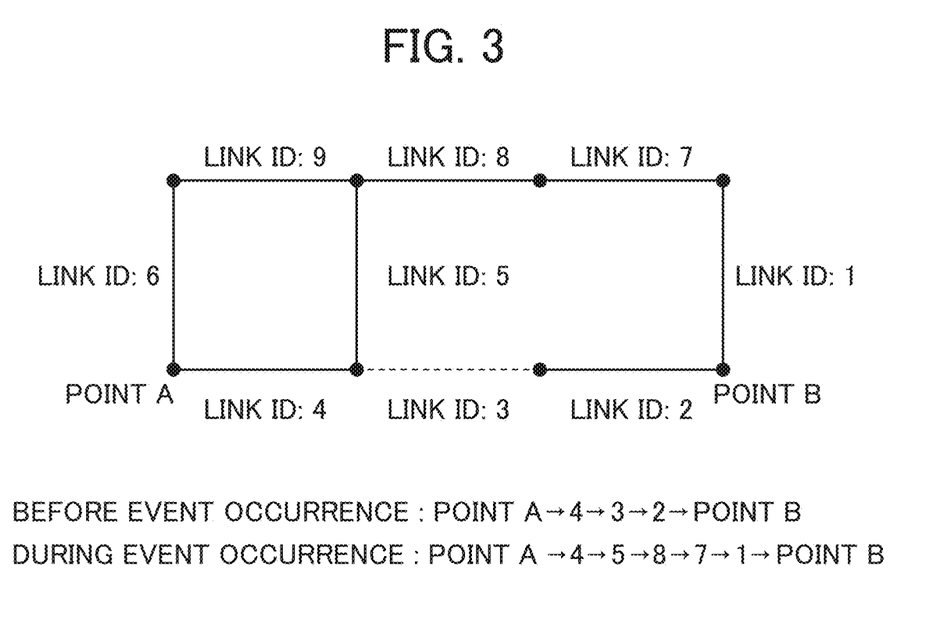
FIG. 3 explains an image of position information using link ID information.

FIG. 3 explains an image of position information by using link ID information. FIG. 3 illustrates a road including nine road links respectively applied link IDs "1" to "9." Then, a situation in which the link ID "3" is reported as position information about a certain event is assumed. On the road of FIG. 3, for example, before occurrence of an event, "point A," link ID "4," link ID "3," link ID "2," and "Point B" in this order can be considered as the shortest driving route from the point A to Point B. As the broken line in FIG. 3, when the link ID "3" is reported as an event occurrence point, the road link of the link ID "3" is calculated as an exclusion domain (exclusion range) disabling driving. Thus, the driving route from the point A to point B takes a detour, specifically, for example, via "point A," link ID "4," link ID "5," link ID "8," link ID "7," link ID "1," and "point B" in this order.

In addition, in FIG. 3, only the road link of the link ID "3" is set as the event occurrence point. Multiple link IDs can also be used as position information about an event. For example, on the road of FIG. 3, when traffic congestion occurs in the straight section from the link ID "2" to link ID "4," the link IDs "2," "3," and "4" are reported as the position information about this event to easily enable identification of the occurrence point of the traffic congestion as a range.

As explained in reference to FIG. 3, when event information uses link ID information, the road section including the event occurrence point can be correctly indicated using the minimum information amount. More processing load may be reduced than when latitude-longitude information is used. When event information uses link ID information, map information managing the correspondences among the link IDs is necessary in the driving domain management unit 110 and also in the vehicles 120 and road side units 130 that are transmission sources of the event related information in some configurations.

The size information about an obstacle indicates a size of the obstacle causing an event, and is used in the event information in combination with the latitude and longitude or link IDs. Moreover, type information about an obstacle indicates a type of the obstacle causing an event. Specifically, the type information may indicate an object type of the obstacle such as a "bicycle," "motorcycle," or "heavy truck" or a condition type of the obstacle such as "road crack," "flooding," and "icing." When the type information about an obstacle is included in the position information about an event, the influence range of the obstacle can be determined or estimated accurately.

The explanation about the "position information" about an event has been made above. The position information about an event may be generated by adequately extracting information from the event related information that is received by the driving condition monitor portion 114 from the vehicles 120 or the road side units 130 and that is used to determine occurrence/release of the event. The position information may be generated after the driving condition monitor portion 114 performs a predetermined process to the information extracted from the event related information.

The explanation of the internal configuration of the driving domain management unit 110 is returned.

The exclusion domain management portion 115 determines an exclusion domain based on the information reported from the driving condition monitor portion 114 on occurrence/release of an event. As in the above description about the exclusion domain information 119, the exclusion domain does not permit (prohibits) driving of the vehicles 120 in preference to the setting of the driving permission domain by the typical patterns 118. That is, even in the driving permission domain set using the typical pattern 118 selected by the change pattern setting portion 113, driving of the vehicles 120 is prohibited in the domain defined as the exclusion domain. The exclusion domain management portion 115 then generates the exclusion domain information 119 as information indicating the determined exclusion domain, transmits the generated exclusion domain information 119 to the distribution portion 116, and stores the generated exclusion domain information 119 in the data storage portion 111.

The distribution portion 116 distributes the information determined in the driving domain management unit 110 to the vehicles 120. Specifically, for example, the distribution portion 116 distributes the typical pattern 118 selected in the change pattern setting portion 113 and the information about the exclusion domain information 119 determined in the exclusion domain management portion 115 to the vehicle control section 122 of the vehicle 120.

In the present embodiment, the distribution method for the information using the distribution portion 116 is not limited to a specific distribution method. The method may distribute changed contents on changing information or may periodically distribute information. For example, with the configuration that holds the typical patterns 118 common in the driving domain management unit 110 and the vehicle 120, when the change pattern setting portion 113 determines selection of the typical pattern 118 different from the former one, that is, when the typical pattern 118 is changed, the distribution portion 116 may distribute the pattern number (change pattern) corresponding to the changed typical pattern 118 to the vehicles 120. For example, with the configuration in which multiple types of the typical patterns 118 are not held in the vehicle 120 but held only in the driving domain management unit 110, the distribution portion 116 may distribute the information about the selected driving permission domain (selected typical pattern 118) to the vehicles 120 one by one as needed.

Next, an internal configuration of the vehicle 120 is explained. As in FIG. 1, the vehicle 120 includes the data storage portion 121, the vehicle control section 122, the vehicle surrounding recognition portion 123, and a driving portion 124.

The data storage portion 121 stores data used in the vehicle 120, mainly various types of information used by the vehicle control section 122. The data storage portion 121 is capable of storing, for example, map information for a navigation system (the same information as the map 117) and multiple types of the typical patterns 118. The data storage portion 121 stores the information (the change patterns, the exclusion domain information 119, etc.) distributed from the distribution portion 116 of the driving domain management unit 110.

The vehicle control section 122 controls autonomous driving by the vehicle 120. Based on the information about the driving permission domain (typical pattern 118) and the exclusion domain (exclusion domain information 119) distributed from the driving domain management unit 110 and on the map information, the vehicle control section 122 finally determines the domain permitting driving of the vehicles 120 (driving permission determination domain), determines a driving route for the vehicles 120 in the domain, and controls driving of the vehicles 120.

More specifically, the vehicle control section 122 can superimpose the driving permission domain in the selected typical pattern 118 onto the road link indicated in the map information, and further overwrites the part of the driving permission domain onto the driving prohibition domain, the part overlapping the exclusion domain in the exclusion domain information 119. The driving permission determination domain for the vehicles 120 can be then determined. Under the restriction of the driving permission determination domain for the vehicles 120 determined in such a way, a driving route for the vehicles 120 is determined, e.g., using a navigation system (not shown).

The vehicle surrounding recognition portion 123 recognizes a surrounding condition of a host vehicle, and specifically, collects information about the surrounding condition of the host vehicle with a sensor, a camera, etc. The vehicle surrounding recognition portion 123 wirelessly transmits the information collected by the vehicle surrounding recognition portion 123 to the driving domain management unit 110 in adequate timing as event related information.

The driving portion 124 controls driving of the vehicle 120 based on the control of the vehicle control section 122. The function of the driving portion 124 may be a common drive control function in an autonomous vehicle. The detail of the function is not explained.

(1-2) Exclusion Domain Management Processing

Figure 4:
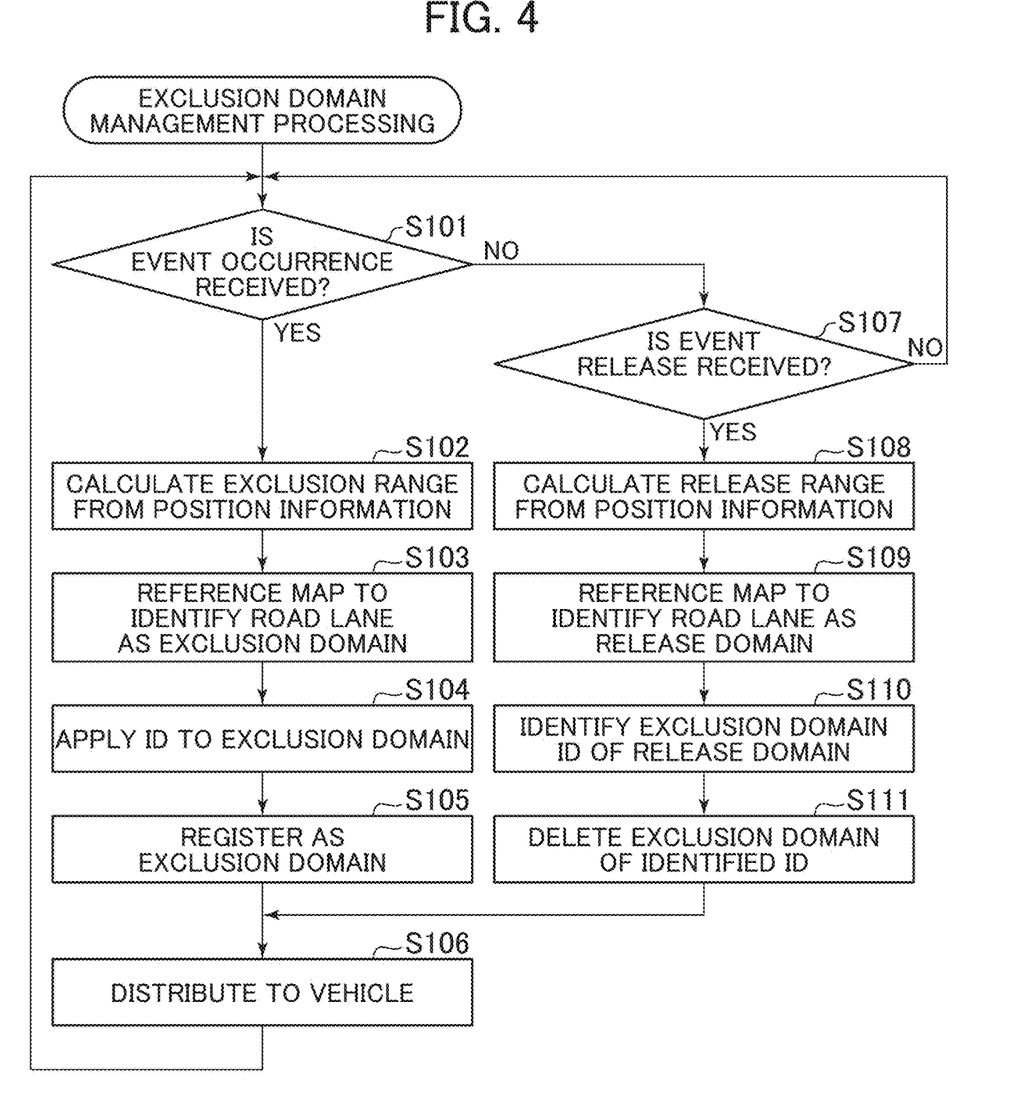
FIG. 4 is a flowchart illustrating an example of a procedure of exclusion domain management processing.

As above, in the driving domain management unit 110 of the present embodiment, the change pattern setting portion 113 determines the driving permission domain by using the typical pattern 118 based on the information changing in time series (time information and weather information). Then, based on occurrence/release of an event, the exclusion domain management portion 115 determines the exclusion domain prohibiting driving even on the driving permission domain of the typical pattern 118. Referring to FIG. 4A, series of processes about this determination of the exclusion domain (exclusion domain management processing) are explained in detail below.

FIG. 4 is a flowchart illustrating an example of a procedure of exclusion domain management processing.

As a precondition for processing of FIG. 4, in the driving domain management unit 110, the driving condition monitor portion 114 determines occurrence of an event or release of an occurring event based on the event related information received from the vehicle surrounding recognition portion 123 of the vehicle 120 or from the road side unit 130 in accordance with a specific criterion. Then, when newly acquiring a determination result of occurrence or release of an event, the driving condition monitor portion 114 reports the occurrence or release of the event and transmits the position information about the event to the exclusion domain management portion 115.

At FIG. 4, the exclusion domain management portion 115 first determines whether the notice of the event occurrence is received from the driving condition monitor portion 114 (step S101). When the notice of the event occurrence is received at step S101 (YES at step S101), the flow proceeds to step S102. When the notice of the event occurrence is not received (NO at step S101), the flow proceeds to step S107 mentioned later.

At step S102, the exclusion domain management portion 115 calculates a road range (exclusion range) having a possibility to restrict driving of the vehicles 120 upon occurrence of an event based on the map 117 and position information about the event. In detail, the exclusion domain management portion 115 identifies the occurrence place of the event from the position information about the event, determines whether the occurrence place of the event is within the range of the autonomous driving domain for the vehicles 120 in reference to the map 117. When the place is within the range of the autonomous driving domain, the exclusion domain management portion 115 calculates a road section that may be influenced by the event as the exclusion range.

In step S102, the exclusion domain management portion 115 excludes, as the exclusion range, not only the event occurrence point but also the overall road sections before and after the point that is to be bypassed when the point is set to be prohibited from driving.

Next, the exclusion domain management portion 115 references the map 117 to identify, from the exclusion range calculated at step S102, a road lane (exclusion domain) not permitting driving of the vehicles 120 actually (step S103). In detail, the exclusion range calculated at step S102 is the whole road that may be influenced by the event occurrence. In step S103, based on the influence range of the event identifiable from the position information about the event, only an actually influenced road lane is further extracted and set as the exclusion domain. Therefore, when only one specific lane of multiple road lanes can be determined to be in the influence range of the event from the position information of the event, this one lane is determined as the exclusion domain. Moreover, for example, when all the lanes can be determined to be in the influence range of the event from the position information about the event, the exclusion range calculated at step S102 is determined as the exclusion domain directly.

Step S103 is processed when an occurrence place of an event is identifiable using position information about the event on a road lane basis. Therefore, when the occurrence place of the event identifiable from the position information about the event remains in a unit of a road, the process of step S103 is unnecessary. The exclusion range calculated at step S102 may be then set as the exclusion domain.

Next, the exclusion domain management portion 115 applies a unique identifier (exclusion domain ID) to the exclusion domain determined through Steps S102 to S103 (step S104), and registers the exclusion domain ID to the data storage portion 111 as the exclusion domain information 119 in association with the exclusion domain (step S105). Further, at step S105, the exclusion domain management portion 115 transmits the registered the exclusion domain information 119 to the distribution portion 116.

As a specific method of recording exclusion domains to the exclusion domain information 119, when the driving domain management unit 110 and the vehicles 120 have map information provided with common identifiers for road links, road lanes, etc., the exclusion domains may be described using the above identifiers. When the driving domain management unit 110 and the vehicles 120 do not have map information provided with common identifiers for road links, road lanes, etc., the exclusion domains may be described using a mode not influenced by the map information (a latitude and longitude, a direction, a lane number, etc.).

When registered at step S105, the exclusion domain information 119 is preferably associated with a unique identifier (event ID) applied to the occurred event. Application of an event ID may be made by the driving condition monitor portion 114 when an occurrence of an event is determined or by the exclusion domain management portion 115 when an event is determined to occur in the range of the autonomous driving domain at step S102. In any case, the exclusion domain information 119 is associated with the event IDs. The driving condition monitor portion 114 is thus capable of identifying an occurring event to which the exclusion domain is set in reference to the exclusion domain information 119. This is usable to determine release of the event.

Then, the distribution portion 116 distributes the information received from the exclusion domain management portion 115 to the vehicles 120 (the exclusion domain information 119 through step S105 and the exclusion domain ID of the exclusion domain information 119 through step S111 mentioned later) (step S106). In step S106, the distribution portion 116 may also distribute, to the vehicle 120, the pattern number of the typical pattern 118 selected in the change pattern setting portion 113. The vehicle 120 stores the information received by the vehicle control section 122 to the data storage portion 121. After the process of step S106, the flow returns to the process of step S101.

In contrast, at step S107 transitioned when the notice of the event occurrence is not received at step S101, the exclusion domain management portion 115 determines whether the notice of the event release is received from the driving condition monitor portion 114. As described also in Step 105, the driving condition monitor portion 114 is capable of identifying that an event is occurring and determining that the occurring event is released based on the received event related information and notifies the exclusion domain management portion 115 of the determination result. An occurrence/release of an event may be determined by the vehicle 120 and the road side unit 130 as an example of another configuration. In this case, the determination result of the occurrence/release of the event from the vehicle 120 and road side unit 130 is reported to the exclusion domain management portion 115 via the driving condition monitor portion 114.

When the notice of the event release is received at step S107 (YES at step S107), the flow proceeds to step S108. When the notice of event release is not received at step S107 (NO at step S107), the flow returns to step S101.

At step S108, the exclusion domain management portion 115 calculates a road range (release range) having a possibility of releasing prohibition of driving of the vehicles 120 in response to the release of the event based on the map 117 and the position information about the event. Calculation of the release range at step S108 may use the calculation method for the exclusion range explained at step S102 by thinking from a different angle, and thus is not explained in detail.

Next, the exclusion domain management portion 115 identifies a road lane (release domain) actually releasing prohibition of driving of the vehicles 120 from the release range calculated at step S108 in reference to the map 117 (step S109). Identification of the release domain at step S109 may use the identification method explained at step S103 by thinking from a different angle, and thus is not explained in detail. As well as at step S103, when an event occurrence point identifiable using event position information remains in a unit of a road, the process at step S109 is unnecessary. The release domain may use the release range calculated at step S108.

Next, the exclusion domain management portion 115 retrieves the exclusion domain information 119 having an exclusion domain corresponding to the release domain determined through Steps S108 to S109 from the data storage portion 111, and identifies the exclusion domain ID of the corresponding exclusion domain information 119 (step S110).

Next, the exclusion domain management portion 115 deletes the exclusion domain information 119 of the exclusion domain ID identified at step S110 from the data storage portion 111 (step S111), and transmits the exclusion domain ID to the distribution portion 116.

The distribution portion 116 distributes the exclusion domain ID received from the exclusion domain management portion 115 to the vehicles 120 (step S106). The vehicle 120 deletes, from the data storage portion 121, the exclusion domain information 119 corresponding to the exclusion domain ID received by the vehicle control section 122. After the process of step S106, the flow returns to the process of step S101.

The exclusion domain management processing is made as above, the exclusion domain is determined in the driving domain management unit 110, and the exclusion domain information 119 is distributed to the vehicle 120. Moreover, in the driving domain management system 100, the pattern number of the typical pattern 118 selected in the change pattern setting portion 113 is also distributed from the driving domain management unit 110 to the vehicles 120. In response to the distribution of the information, the vehicle control section 122 of the vehicle 120 becomes able to determine the driving permission determination domain permitting driving of the vehicles 120 by combining the distributed information and the map information stored in the data storage portion 121. Thus, the vehicle control section 122 determines a driving route for the vehicles 120 in the driving permission determination domain to allow the vehicles 120 to be driven on the safety driving route. That is, according to the driving domain management system 100 (driving domain management unit 110) of the present embodiment, in response to various events that may obstruct driving, the domains where the vehicles 120 are safely driven are manageable.

The driving domain management system 100 of the first embodiment is not limited to the above explanation content and can derivatively use various modifications. Features of some modifications are explained below.

(1-3) Modification 1

As above, in the driving domain management system 100, the driving condition monitor portion 114 receives the event related information about an event that needs restriction of driving of the vehicles 120 from the vehicle surrounding recognition portion 123 of the vehicle 120 or the road side unit 130. This event related information includes information collected from sensors and cameras provided to the vehicle surrounding recognition portion 123 or the road side unit 130. Detection accuracies differ due to capabilities etc. of the sensors and cameras. The reliability of the event related information may thus change. The reliability changes due to vehicle types that collect the information.

In the first modification (modification 1) of the driving domain management system 100, a reliability is applied to event related information and an exclusion domain is determined in consideration of the reliability.

In the modification 1, a reliability is previously set to each capability of the sensors and cameras of the vehicle surrounding recognition portion 123 and the road side units 130 or to each vehicle type of the vehicles 120 including the vehicle surrounding recognition portion 123. The collected event related information having the corresponding reliability is transmitted to the driving condition monitor portion 114. As another example of a subject that applies a reliability, the driving condition monitor portion 114 may apply a reliability to each received event related information in dependence on a transmission source of the information. The reliability is not limited to one defined in dependence on a collection source of information. The reliability may be determined based on a type of an obstacle in an event (name of an obstacle) indicated by the collected information. In this case, by use of a likelihood when an obstacle name is statistically processed, the reliability may be applied to each event related information. In the following specific example, the reliability is indicated by numerical values "0" to "1." As the numerical value is higher, the reliability is higher.

In the exclusion domain management processing in the modification 1, when the exclusion domain management portion 115 receives the notice of an event occurrence from the driving condition monitor portion 114, (YES at step S101 of FIG. 4), In accordance with the reliability applied to targeted event related information, it is determined whether to proceed to the determination processing of an exclusion range and an exclusion domain (steps S102 and S103). Specifically, when the reliability is "0.7" or more, the flow proceeds to the determination processing of the exclusion range and the exclusion domain and when the reliability is less than "0.5," the flow returns to step S101 without proceeding to the determination processing of the exclusion range and the exclusion domain. Moreover, when the reliability is "0.5" or more and less than "0.7," exclusion domain statistical information (for example, assumed to be held on the data storage portion 111) having accumulated past usage results about the determinations of exclusion domains are referenced. Then, when the event related information is recorded as a sufficient result, the flow proceeds to the determination processing of the exclusion range and the exclusion domain. When the event related information is not recorded as a sufficient result, the flow returns to step S101 without proceeding to the determination processing of the exclusion range and the exclusion domain.

In the modification 1, the exclusion domain management processing is executed as above to be able to determine the exclusion domain in consideration of the reliability of the received event related information. Thus, after detection information (event related information) about various events that may obstruct driving is determined more accurately than in the first embodiment, management of driving domains for the vehicles 120 is realizable.

The static reliability is applied to the event related information in the explanation of the modification 1. As anther example, a dynamic reliability may be set to a road section (for example, a road link) identified from position information about event related information. Specifically, for example, the reliability of a target road link is changed in accordance with a collection record of event related information. Only when an event occurs in a road link where the reliability is over a predetermined threshold, determination processing of an exclusion range and an exclusion domain is made. In contrast, when an event occurs in a road link where a collection record of the event related information is low due to, e.g., a low passage volume of vehicles, determination processing of the exclusion range and the exclusion may not be made due to the lowness of reliability.

(1-4) Modification 2

As above, in the driving domain management system 100, the change pattern setting portion 113 selects the driving permission domain (typical pattern 118) based on information changing in time series (time information, weather information, etc.). Further, the driving domain management system 100 includes the setting operation portion 112 to be able to change setting of the driving management for the vehicles 120 in response to manual operations by the user (dispatcher) to the dispatcher setting screen. Such a driving domain management system 100 is explained as the second modification (modification 2).

FIG. 5 illustrates an example of the dispatcher setting screen. The dispatcher setting screen 140 illustrated in FIG. 5 is an example of the screen for setting warehouse management of the autonomously driven vehicles 120 to transport packages between a warehouse and a factory building in the site of the business. The dispatcher setting screen 140 is displayed on a predetermined output device, and specifically, displayed on a display connected to the driving domain management unit 110 as a GUI (Graphical User Interface).

When the user (dispatcher) selects the button of a route optimization 141 on the dispatcher setting screen 140 of FIG. 5, the driving domain management unit 110 or the vehicle 120 calculates an optimal driving route with a current setting out via the change pattern setting portion 113. The calculated driving route is visually displayed on a plan map 143 on the right area of the dispatcher setting screen 140. When the user (dispatcher) selects the button of a route plan 142, the setting operation portion 112 can change a selection schedule of the typical patterns 118 held by the change pattern setting portion 113 (or the data storage portion 111) or update the typical patterns 118 stored in the data storage portion 111. Additionally, information about the typical pattern 118 or the exclusion domain information 119 stored in the data storage portion 111 can be displayed on the dispatcher setting screen 140.

A condition for effectively changing the selection schedule of the typical patterns 118 by using the dispatcher setting screen 140 can include, for example, setting the selection schedule to change a driving route between in and outside business hours and setting the selection schedule for a temporary event such as a construction and an event in the site of the business differently from a normal schedule.

As above, in the modification 1, not only selection of the driving permission domain (typical pattern 118) based on the information changing in time series (time information, weather information, etc.) but also changing of selection of the driving permission domain (typical pattern 118) in response to a request of the user are possible. The usability of the driving domain management system 100 is improvable.

(1-5) Another Modification

The driving domain management system 100 of the present embodiment is explained as one that manages the driving domain to provide permission to the vehicles 120 based on selection of the typical pattern 118 and determination of the exclusion domain information 119. Management targets using the driving domain management system 100 are not limited to the driving domains. For example, the driving domain management system 100 may change the driving condition (for example, a speed regulation and a regulation of a type of a drivable vehicle) of permission for the vehicles 120 based on selection of the typical pattern 118 and determination of the exclusion domain information 119. The combination of the driving domain and the driving condition may be also changeable.

In the above processing method, when driving is prohibited in a newly determined exclusion domain and the vehicle 120 already exists in the determined exclusion domain, the vehicle 120 may become unable to autonomously move. In the driving domain management system 100 of the present embodiment, restriction in the driving domain based on the exclusion domain may be extended for the vehicles 120 existing in the exclusion domain until the vehicles 120 move to outside the exclusion domain. Alternatively, for example, when a serious event occurs, driving of the vehicles 120 existing in the exclusion domain may be controlled to be Immediately stopped.

The above various modifications are adequately applicable not only to the driving domain management system 100 of the first embodiment but also a driving domain management system of another embodiment of the present invention mentioned later.

(2) Second Embodiment

Figure 6:
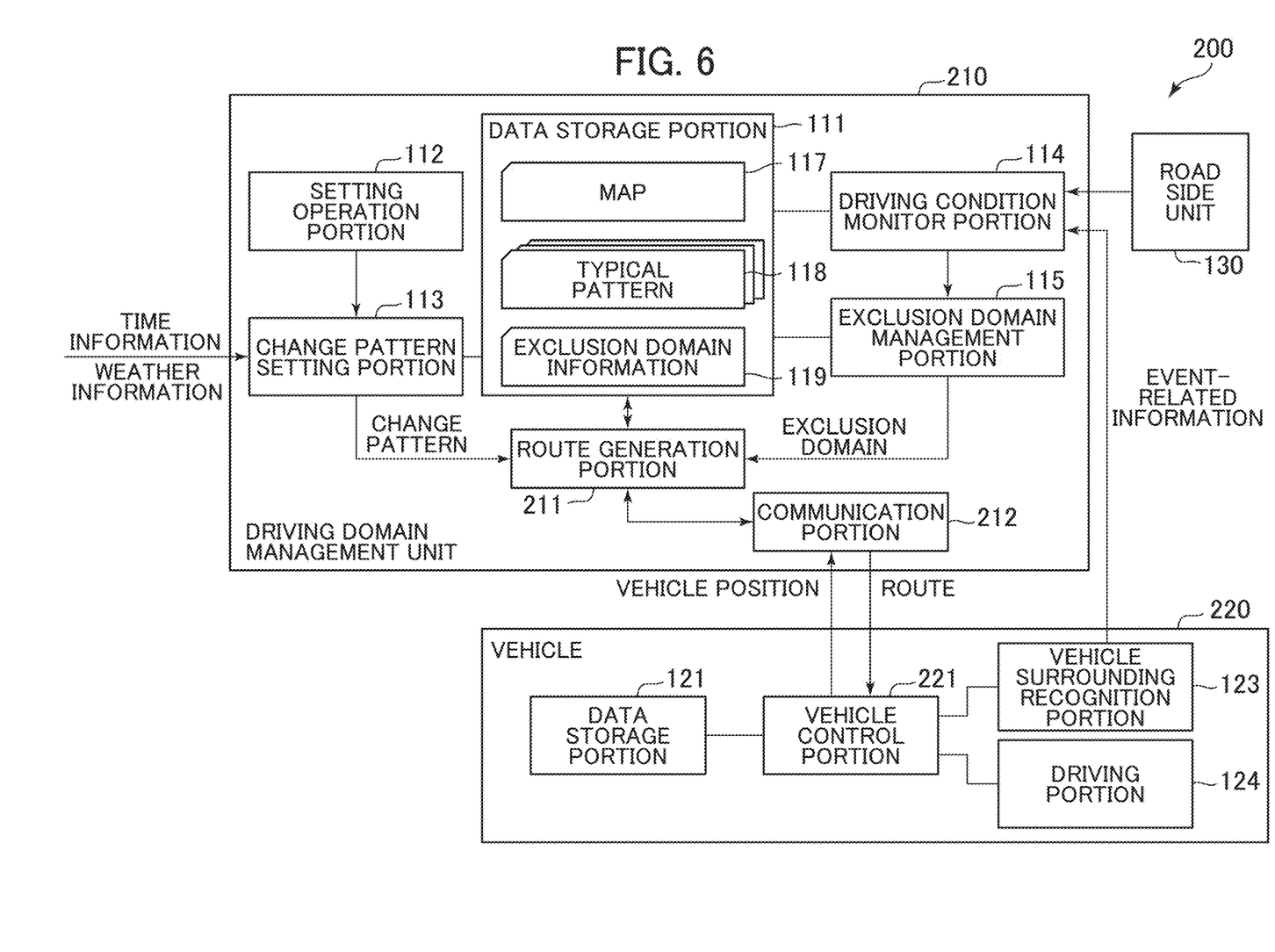
FIG. 6 is a block diagram illustrating an example of a configuration of a driving domain management system 200 of the second embodiment of the present invention.

FIG. 6 is a block diagram illustrating an example of a configuration of a driving domain management system 200 of the second embodiment of the present invention. In the driving domain management system 100 of the first embodiment, a driving route for the vehicles 120 is determined by the vehicles 120. The driving domain management systems 200 of the second embodiment differs in that a route generation portion 211 of a driving domain management unit 210 determines a driving route of a vehicle 220. In the second embodiment, a difference from the first embodiment is mainly explained, and explanation about the common configuration and processing is not made.

As in FIG. 6, the route generation portion 211 receives the change pattern of the driving permission domain (typical pattern 118) from the change pattern setting portion 113 and receives information (exclusion domain information 119) about the exclusion domain from the exclusion domain management portion 115. Selection of the typical pattern 118 by the change pattern setting portion 113 and determination of the exclusion domain information 119 by the exclusion domain management portion 115 are the same as in the first embodiment. Further, the route generation portion 211 acquires information about a current position (vehicle position) of the vehicle 220 from a vehicle control section 221 of the vehicle 220 via a communication portion 212. The communication portion 212 has a function to receive predetermined information from the vehicle 220 in addition to a function of the distribution portion 116 that distributes information to the vehicles 120 (vehicles 220).

The route generation portion 211 configured as above has a function to generate a driving route for the vehicles 220 based on the information about the received driving permission domain (typical pattern 118) and the received exclusion domain (exclusion domain information 119), the map information (map 117) stored in the data storage portion 111, and the information about a vehicle position acquired from the vehicle 220. In detail, first, the route generation portion 211 superimposes the typical pattern 118 and the exclusion domain information 119 onto the map 117 to determine the final domain (driving permission determination domain) permitting driving of the vehicles 220, and next generates an optimal driving route for the vehicles 220 in the driving permission determination domain. The route generation portion 211 distributes the generated driving route to the vehicles 220 via the communication portion 212. The vehicle control section 221 controls the autonomous driving of the vehicles 220 according to the distributed driving route.

As above, in the second embodiment, the driving domain management unit 210 determines the driving route for the autonomously driven vehicles 220. In addition to the advantageous effect acquired in the first embodiment, the advantageous effect that the management of driving of the vehicles 220 is made more rigid is acquirable. In the second embodiment, the vehicle 220 does not need to receive the information about the typical pattern 118 and the exclusion domain information 119 from the communication portion 212. Compared with in the first embodiment, a communication amount between the driving domain management unit 210 and the vehicle 220 is reduceable. Particularly, when the exclusion domain information 119 determined in the exclusion domain management portion 115 in response to occurrence of an event has low relationship with the area where the vehicle 220 is being driven (away from the domain where the vehicle 220 is being driven), distribution of the exclusion domain information 119 is harmful for the vehicle 220 due to increase in the communication amount. According to the second embodiment, such a disadvantage is solvable.

(3) Third Embodiment

Figure 7:
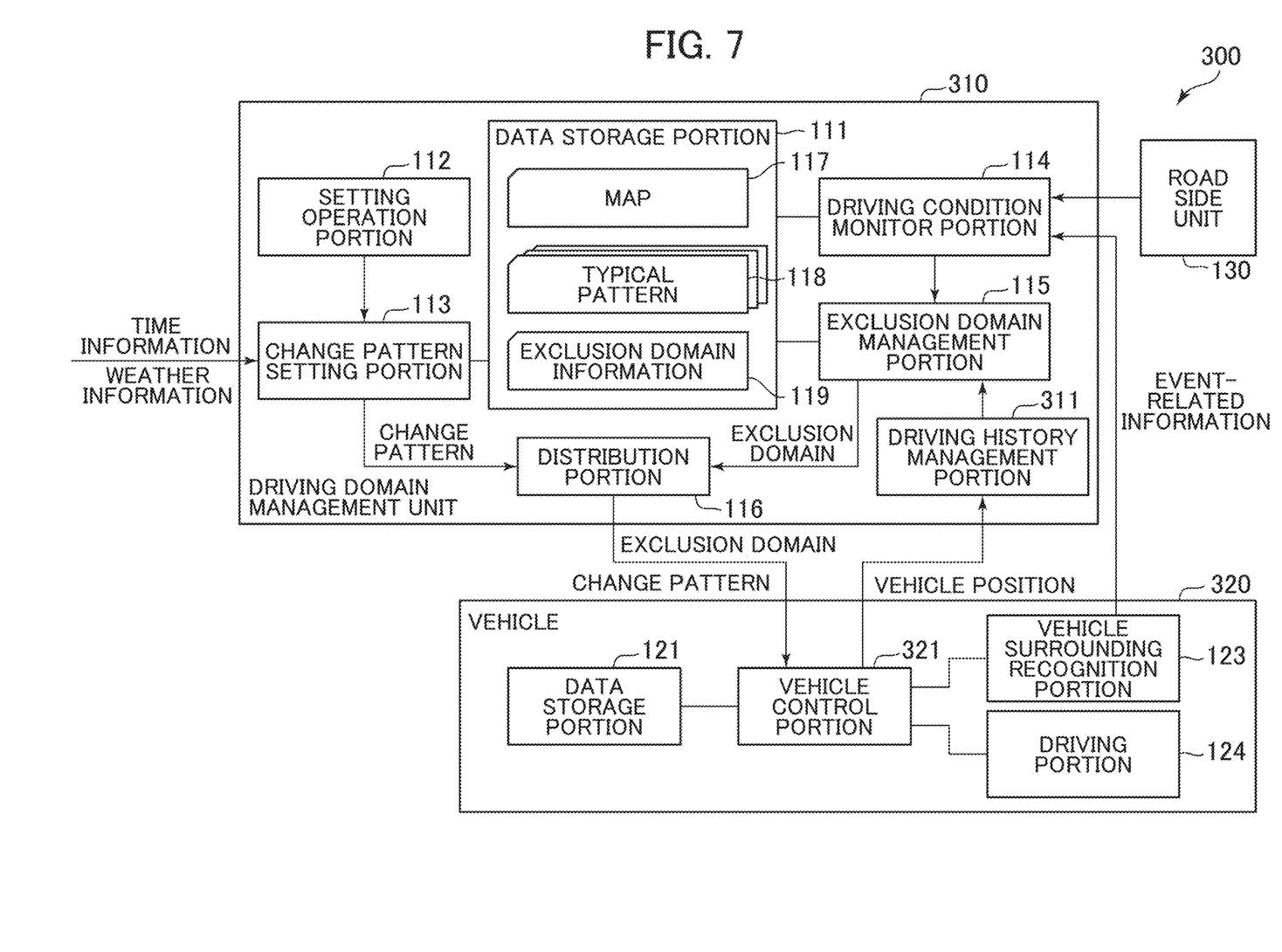
FIG. 7 is a block diagram illustrating an example of a configuration of a driving domain management system 300 of the third embodiment of the present invention.

FIG. 7 is a block diagram illustrating an example of a configuration of a driving domain management system 300 of the third embodiment of the present invention. The driving domain management system 300 of the third embodiment has the same configuration as the driving domain management system 100 of the first embodiment but is different from the first embodiment in that the driving domain management system 300 includes a driving history management portion 311. In the third embodiment, the difference from the first embodiment is mainly explained, and the common components and processes are not explained.

As in FIG. 7, the driving history management portion 311 periodically acquires information about a current position (vehicle position) of the vehicle 220 from a vehicle control section 321 of a vehicle 320 to accumulate the driving history (driving record) of the vehicle 320 into a storage area of the driving history management portion 311 (or the data storage portion 111 is also available). The information about the vehicle position may be transmitted from the vehicle control section 321 to the driving history management portion 311 via an unillustrated communication portion.

In the third embodiment, the vehicle 320 includes multiple vehicles managed by the driving domain management unit 310. It is assumed that each vehicle 320 has a different vehicle size. Then, the driving history management portion 311 accumulates information about a vehicle position received from each vehicle 320 as driving records by distinguishing the types (for example, based on vehicle sizes, explained using a large vehicle and a small vehicle) of the vehicles 320 from each other by each road or road lane including vehicle positions (for example, using a road link as a unit). The driving history management portion 311 may acquire and accumulate vehicle positions as driving records not only from the vehicles 320 whose driving domains are controlled by the driving domain management unit 310 but also from vehicles other than the vehicles 320, such as vehicles other than autonomous vehicles. In that case, more driving records can be accumulated to improve the reliability and accuracy of the information. The driving history management portion 311 predetermines the following exclusion domains based on the accumulated driving records.

The predetermination of the exclusion domain is made to set the "exclusion domain" to a road section (for example, a road link) meeting a predetermined condition based on a driving history before determination of the exclusion domain (exclusion domain information 119) by the exclusion domain management portion 115. The "exclusion domain" set in the predetermination of the exclusion domain is also called a "specified exclusion domain" to be distinguished from the "exclusion domain" determined by the exclusion domain management processing of FIG. 4.

In the predetermination of the exclusion domain, the driving history management portion 311 first sets the specified exclusion domain for large vehicles to a road link having no driving record. In this case, setting is not particularly applied to small vehicles. Then, when a driving record by a small vehicle is acquired in the specified exclusion domain dedicated for large vehicles, the driving history management portion 311 releases the exclusion setting for large vehicles in the specified exclusion domain. That is, the specified exclusion domain is not set to large vehicles or small vehicles. In this example, vehicle size types of the vehicles 320 are explained as two types, large vehicles and small vehicles for convenience. The specified exclusion domain may be actually set to more types of vehicles.

The result of the predetermination of the above exclusion domain by the driving history management portion 311 is reported to the exclusion domain management portion 115, and then reflected in the determination of the exclusion domain information 119. Specifically, when the driving history management portion 311 sets the specified exclusion domain for large vehicles, the exclusion domain management portion 115 certainly includes the set specified exclusion domain in the exclusion domain in determining the exclusion domain information 119 for the vehicles 320 that are large vehicles. When the setting of the specified exclusion domain for the large vehicles is released, the exclusion domain management portion 115 performs exclusion domain management processing of FIG. 4 to determine the exclusion domain information 119 for the vehicles 320 without specific restrictions.

In the third embodiment as above, the specified exclusion domain is set based on the driving histories of the multiple vehicles 320. The histories are sorted by vehicle size and accumulated. Thus, even when the event related information collected from the vehicles 320 or the road side units 130 is poor, roads and environment conditions are not sufficiently understood, and it is thus difficult to determine the exclusion domain on which driving is to be prohibited, occurrence of an event obstructing driving can be estimated to distribute to safety driving control of the vehicles 120. Particularly, when many road sections disabling driving are present, for example, when disaster occurs, it is known that large vehicles are likely to become stranded. According to the present embodiment, only driving of small vehicles first is permitted (the specified exclusion domain is set to large vehicles). After that, driving of large vehicles is permitted when driving histories of small vehicles are acquired. Unexpected troubles of large vehicles are thus avoidable. The present embodiment can expect a particularly great advantageous effect in a road section on which detection of the event related information by the road side units 130 is insufficient due to failure or uninstallation of the road side units 130.

The present invention is not limited to each above embodiment, and includes various modifications. For example, each above embodiment is explained in detail for easy understanding, and not necessarily limited to one including all the explained configurations. It is possible to replace part of a configuration of an embodiment with a configuration of another embodiment. It is also possible to add, to a configuration of an embodiment, a configuration of another embodiment. For example, when adding the concept of the reliability explained in the modification 1 of the first embodiment to the driving domain management system 300 of the third embodiment, the event related information and the driving record may be combined with each other to apply the reliability to each road section (road link etc.). In this case, for example, the reliability for the road link having no driving record is reduced and the reliability is raised when the driving record is acquired. The exclusion domain can be thus determined based on the statistical information and reliability of the exclusion domain. Additions, deletions, and substitutions can be made in some configurations of each embodiment by using other configurations.

Part or all of the above configurations, functions, processing portions, processing units, etc. may be achieved using hardware, e.g., by a design using an integrated circuit. Each of the above configurations, functions, etc. may be achieved using software when a processor interprets and executes a program that realizes each function. The information including a program, a table, a file, etc. that realize each function can be stored on a recording device such as a memory, a hard disk, an SSD (Solid State Drive) or on a recording medium such as an IC card, an SD card, and a DVD.

In the drawings, the control lines and information lines considered to be necessary for the explanation are illustrated. All the control lines and information lines are not necessarily illustrated for a product. Nearly all of the configurations may be considered to be actually connected to each other.

What is claimed is:

1. A driving domain management unit that manages a driving domain for an autonomous vehicle, comprising:
a change pattern setting portion that selects one of a plurality of typical patterns previously establishing drivable domains based on input information changing in time series to determine a driving permission domain permitting driving of the vehicle;
a driving condition monitor portion that collects event related information about an event causing deterioration of a road condition to determine the event based on the collected event related information;
an exclusion domain management portion that determines an exclusion domain prohibiting driving of the vehicle in preference to the driving permission domain indicated by the typical pattern based on a result of the determination by the driving condition monitor portion and position information about the event included in the event related information used for the determination, wherein the exclusion domain management portion overrides a setting of the driving permission domain and calculates a road range to restrict driving of the vehicle upon occurrence of the event, the road range prohibits driving at a point in which the event occurred as well as designated road sections before and after the point in which the event occurred, the event used for calculating the road range to restrict driving is determined by information reported from the driving condition monitor portion on occurrence of the event;
a distribution portion that distributes the typical pattern selected by the change pattern setting portion and the information about the exclusion domain determined by the exclusion domain management portion or the change pattern and the information based on the exclusion domain; and
a data storage portion that stores the multiple typical patterns and the information about the exclusion domain.

2. The driving domain management unit according to claim 1 wherein the input information includes time information or weather information, and the change pattern setting portion selects the typical pattern in accordance with a schedule corresponding to the input information.

3. The driving domain management unit according to claim 1 further comprising:

a setting operation portion that changes selection of the typical pattern by the change pattern setting portion.

4. The driving domain management unit according to claim 1 wherein the driving condition monitor portion determines occurrence and release of the event, and the exclusion domain management portion determines the exclusion domain based on position information about the event when the driving condition monitor portion determines occurrence of the event and releases the exclusion domain determined upon the occurrence of the event when the driving condition monitor portion determines release of the event.

5. The driving domain management unit according to claim 1 wherein when prohibiting driving on an occurrence point of the event, the point being indicated in the position information about the event, the exclusion domain management portion determines a whole of road sections before and after the occurrence point as the exclusion domain, the road sections being needed to be bypassed.

6. The driving domain management unit according to claim 1 wherein the drivable domain is set to a road lane as a unit in the plurality of typical patterns, and the exclusion domain management portion determines the exclusion domain in a road lane as a unit based on the position information about the event.

7. The driving domain management unit according to claim 1 wherein the data storage portion further stores map information, a final domain permitting driving of the vehicle is confirmed by excluding the exclusion domain determined by the exclusion domain management portion from the driving permission domain indicated in the typical pattern selected by the change pattern setting portion, a driving route of the vehicle which is generated in the confirmed domain by using information about a vehicle position, the information being acquired from the vehicle, and the map information stored in the data storage portion is further included, and the distribution portion distributes, to the vehicle, the driving route of the vehicle.

8. The driving domain management unit according to claim 1 further comprising:

a driving history management portion that acquires vehicle positions of a plurality of the vehicles, accumulates a driving record for each vehicle type, and sets the exclusion domain to a road section meeting a predetermined condition based on the driving record.

9. The driving domain management unit according to claim 8 wherein the driving history management portion sets the exclusion domain for a predetermined vehicle different from a specific vehicle to a road section not having the driving record.

10. The driving domain management unit according to claim 9 wherein when acquiring the driving record of the specific vehicle in a road section on which the exclusion domain is set for the predetermined vehicle, the driving history management portion releases setting of the exclusion domain for the predetermined vehicle in the road section.

11. The driving domain management unit according to claim 1 wherein the exclusion domain management portion determines whether to determine the exclusion domain based on a reliability applied to each piece of the event related information.

12. A driving domain management system comprising:

one or more vehicles able to be autonomously driven; and a driving domain management unit in communication with the vehicles to manage driving domains for the vehicles, the driving domain management unit including:

a change pattern setting portion that determines a driving permission domain permitting driving of the vehicles by selecting one of a plurality of typical patterns previously establishing drivable domains based on input information changing in time series;

a driving condition monitor portion that collects event related information about an event causing deterioration of a road condition from the vehicles and determines the event based on the collected event related information;

an exclusion domain management portion that determines an exclusion domain prohibiting driving of the vehicles in preference to the driving permission domain indicated in the typical pattern based on a result of the determination by the driving condition monitor portion and on position information about the event, the position information being included in the event related information used in the determination, wherein the exclusion domain management portion overrides a setting of the driving permission domain and calculates a road range to restrict driving of the vehicle upon occurrence of the event, the road range prohibits driving at a point in which the event occurred as well as designated road sections before and after the point in which the event occurred, the event used for calculating the road range to restrict driving is determined by information reported from the driving condition monitor portion on occurrence of the event;

a distribution portion that distributes, to the vehicles, the typical pattern selected by the change pattern setting portion and information about the exclusion domain determined by the exclusion domain management portion or the typical pattern and information based on the exclusion domain; and a data storage portion that stores the plurality of typical patterns and information about the exclusion domain, wherein the vehicles are autonomously driven in a driving domain permitted using the information distributed from the distribution portion.

13. The driving domain management system according to claim 12 further comprising:

a plurality of road side units installed near a road to monitor the road or surroundings of the road, wherein at least any of the vehicles or the road side units detects the event related information to provide the event related information to the driving domain management unit.

14. The driving domain management system according to claim 12 wherein the system excludes the exclusion domain received from the distribution portion from the driving permission domain indicated in the typical pattern received from the distribution portion to confirm a final domain permitting driving of a host vehicle and to generate a driving route of the host vehicle in the confirmed domain by using information about a vehicle position held by the host vehicle and map information.

15. A driving domain management method for managing a driving domain for a vehicle able to autonomously drive by using a driving domain management unit, comprising:

a typical pattern selection step of determining a driving permission domain permitting driving of the vehicles by selecting one of a plurality of typical patterns previously patterning drivable domains based on input information changing in time series;

an event determination step of collecting event related information relating an event causing deterioration of a road to determine the event based on the collected event related information;

an exclusion domain determination step of determining an exclusion domain prohibiting driving of the vehicles in preference to the driving permission domain indicated in the typical pattern based on a result of the determination at the event determination step and position information about the event included in the event related information used in the determination, wherein the exclusion domain management portion overrides a setting of the driving permission domain and calculates a road range to restrict driving of the vehicle upon occurrence of the event, the road range prohibits driving at a point in which the event occurred as well as designated road sections before and after the point in which the event occurred, the event used for calculating the road range to restrict driving is determined by information reported from the driving condition monitor portion on occurrence of the event; and a distribution step of distributing, to the vehicles, the typical pattern selected at the typical pattern selection step and information about the exclusion domain determined at the exclusion domain determination step or the typical pattern and information based on the exclusion domain.

* * * * *